US011880351B1

(12) United States Patent
Kitsis et al.

(10) Patent No.: US 11,880,351 B1
(45) Date of Patent: Jan. 23, 2024

(54) SYSTEMS AND METHODS FOR STORING AND VERIFYING DATA

(71) Applicant: Wells Fargo Bank, N.A., San Francisco, CA (US)

(72) Inventors: Sudipta Kitsis, San Francisco, CA (US); Jose Salazar, San Francisco, CA (US); Lashana Wiggs, San Francisco, CA (US); Michael Annetti, San Francisco, CA (US); Rohit Bodhale, Charlotte, NC (US); Sachin Rege, San Francisco, CA (US); Melissa Meacham, Charlotte, NC (US); Anya Carpentier, Boston, MA (US); Vinay Maganti, San Leandro, CA (US); Jacquelin Macdonald, Tempe, AZ (US); Todd Lewis, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 103 days.

(21) Appl. No.: 17/229,539

(22) Filed: Apr. 13, 2021

Related U.S. Application Data

(60) Provisional application No. 63/009,878, filed on Apr. 14, 2020.

(51) Int. Cl.
*G06F 16/00* (2019.01)
*G06F 16/23* (2019.01)
*G06F 3/04842* (2022.01)
*G06F 16/215* (2019.01)

(52) U.S. Cl.
CPC ...... *G06F 16/2358* (2019.01); *G06F 3/04842* (2013.01); *G06F 16/215* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 8,281,129 B1 | 10/2012 | Asghari-Kamrani et al. | |
| 9,501,923 B2 | 11/2016 | Tijerina et al. | |
| 9,591,052 B2* | 3/2017 | Marins | H04L 67/02 |
| 9,805,213 B1 | 10/2017 | Kragh | |
| 10,055,736 B2 | 8/2018 | Ahuja | |
| 10,255,419 B1 | 4/2019 | Kragh | |

(Continued)

*Primary Examiner* — Bai D Vu
(74) *Attorney, Agent, or Firm* — Foley & Lardner LLP

(57) ABSTRACT

Systems and methods can include a provider institution accounts database structured to retrievably store data corresponding to a plurality of entities including a primary entity related to a plurality of secondary entities. The data for each of the plurality of entities may include values for a plurality of fields associated with the respective entity. A data management circuit may be configured to detect that one or more fields corresponding to at least one of the secondary entities has a value which is to be updated. The data management circuit may generate a first user interface that causes the user to confirm authorization to provide the value for the one or more fields, and a second user interface including a field for receiving the value. The data management circuit may receive the value, and update the data corresponding to the at least one secondary entity in the provider institution accounts database.

22 Claims, 19 Drawing Sheets

(56) References Cited

U.S. PATENT DOCUMENTS

| | | |
|---|---|---|
| 10,339,506 B2 | 7/2019 | Kassemi et al. |
| 10,360,252 B1 * | 7/2019 | Kraytem .............. G06F 3/0482 |
| 10,467,624 B2 | 11/2019 | Schlesinger et al. |
| 10,521,623 B2 | 12/2019 | Rodriguez et al. |
| 10,621,658 B1 | 4/2020 | Sahni et al. |
| 10,692,136 B2 | 6/2020 | Pinski |
| 2005/0091059 A1 * | 4/2005 | Lecoeuche ........ H04M 1/72445 |
| | | 704/270.1 |
| 2008/0028220 A1 | 1/2008 | Wyssen |
| 2013/0232106 A1 * | 9/2013 | Shah ....................... G06F 16/23 |
| | | 707/E17.005 |
| 2014/0058844 A1 | 2/2014 | Jadeja et al. |
| 2014/0188677 A1 | 7/2014 | Patel et al. |
| 2015/0026082 A1 | 1/2015 | Phadnis et al. |
| 2015/0220892 A1 | 8/2015 | Allen |
| 2015/0220928 A1 | 8/2015 | Allen |
| 2015/0326522 A1 | 11/2015 | Pu et al. |
| 2016/0063075 A1 | 3/2016 | Fergusson |
| 2016/0071103 A1 | 3/2016 | Fergusson |
| 2016/0142397 A1 | 5/2016 | Froelich et al. |
| 2016/0171511 A1 | 6/2016 | Goel et al. |
| 2016/0232534 A1 | 8/2016 | Lacey et al. |
| 2016/0255082 A1 * | 9/2016 | Rathod .................. G06Q 50/01 |
| | | 726/1 |
| 2016/0283941 A1 | 9/2016 | Andrade |
| 2017/0004582 A1 * | 1/2017 | Engström .............. G06Q 40/03 |
| 2017/0140174 A1 | 5/2017 | Lacey et al. |
| 2017/0278106 A1 | 9/2017 | Fergusson |
| 2017/0352098 A1 | 12/2017 | Roberts et al. |
| 2018/0005239 A1 | 1/2018 | Schlesinger et al. |
| 2018/0114277 A1 | 4/2018 | Whitmer |
| 2018/0165781 A1 | 6/2018 | Rodriguez et al. |
| 2018/0204213 A1 | 7/2018 | Zappier et al. |
| 2018/0240107 A1 | 8/2018 | Andrade |
| 2018/0246960 A1 * | 8/2018 | Rathod .............. G06Q 30/0282 |
| 2018/0342015 A1 | 11/2018 | Austin et al. |
| 2018/0343120 A1 | 11/2018 | Andrade |
| 2019/0019184 A1 | 1/2019 | Lacey et al. |
| 2019/0206002 A1 | 7/2019 | Gupta |
| 2019/0286646 A1 * | 9/2019 | Kraytem .............. G06F 40/205 |
| 2019/0295080 A1 | 9/2019 | Fergusson |
| 2019/0333054 A1 | 10/2019 | Cona et al. |
| 2020/0106611 A1 | 4/2020 | Bharatam et al. |
| 2020/0119921 A1 | 4/2020 | Rodriguez et al. |
| 2020/0211124 A1 | 7/2020 | Bhagat et al. |
| 2020/0250571 A1 | 8/2020 | Almasan et al. |
| 2021/0303544 A1 * | 9/2021 | Liu .................. G06Q 10/06395 |
| 2022/0179665 A1 * | 6/2022 | Rathod .................... G06F 9/451 |

\* cited by examiner

Compliance Information Requests

Review and Confirm

Support

Periodic Review Support Center
- Telephone
- Email address

Help

302

304

Privacy, Security & Legal    Terms of Use

306

Sign Off — 308

Sign Off — 308

Relationship in Review — 340

Review and Confirm — 326

What is Customer Due Diligence? ⓘ
What does this mean for you? ⓘ

Compliance Information Requests — 328

Review and confirm the accuracy of the information provided for the relationships listed below.

304

| | Relationships | Due Date | Status | Action |
|---|---|---|---|---|
| + | ABC Corporation | 08/21/19 | | |
| ⇔ | XYZ Corporation | 07/26/19 | In Review | Select ⌄ — 342 |

Download Summary
View Summary — 344

Legal Entities
Blue Sky Keyboards LLC
Cartoons Now
CCP NewCo LLC
Centrex Enterprise
Creative Plastics
Shoebe Otto
Tom's Restaurant Date Submitted 7/31/2019

| | Compliance Information Requests |
|---|---|
| Review and Confirm | Review and Confirm for XYZ Corporation |
| Support | < Return to Compliance Information Requests |
| Periodic Review Support Center | Step 1 - Authorized Person Confirmation — 402 |
| ☏ Telephone | *Required |
| ✉ Email address | Confirm that you are authorized, by the legal entity customer, to review and attest to information presented for each legal entity listed below. — 404 |
| Help | If you are not authorized to review provided information for any of the below legal entities, that legal entity will be removed from this review process, and a Wells Fargo team member will follow up with the correct Authorized Person. |
| | What is an Authorized Person? ⓘ — 408 |
| | What is a Legal Entity Customer? ⓘ |
| | Legal Name |
| | Susie Que — 410 |
| | Title |
| | COO |
| | **\*Are you the Authorized Person for the following Legal Entities?** — 406 |
| | Blue Sky Keyboards LLC   ○Yes ○No   Creative Plastics   ○Yes ○No |
| | Cartoons Now   ○Yes ○No   Shoebe Otto   ○Yes ○No |
| | CCP NewCo LLC   ○Yes ○No   Tom's Restaurant   ○Yes ○No |
| | Centrex Enterprise   ○Yes ○No |
| | By Selecting "Continue," you are confirming your Authorized Person status for the legal entities identified above. After continuing, you will not be able to make changes to this confirmation without Wells Fargo Relationship Manager assistance. — 412 |
| | [Continue] Cancel — 414 |

\* Are you the Authorized Person for the following Legal Entities? 406

| | | | | | |
|---|---|---|---|---|---|
| Blue Sky Keyboards LLC | ⦿ Yes | ○ No | Creative Plastics | ⦿ Yes | ○ No |
| Cartoons Now | ⦿ Yes | ○ No | Shoebe Otto | ○ Yes | ⦿ No |
| CCP NewCo LLC | ⦿ Yes | ○ No | Tom's Restaurant | ⦿ Yes | ○ No |
| Centrex Enterprise | ⦿ Yes | ○ No | | | |

⚠ All legal entities selected "No" will be removed from this review process.

By selecting "Continue," you are confirming your Authorized Person status for the legal entities identified above. After continuing, you will not be able to make changes to this confirmation without Wells Fargo Relationship Manager assistance.

[Continue] Cancel
 412  414

FIG. 4B

Compliance Information Requests

Review and Confirm for XYZ Corporation

< Return to Compliance Information Request Tasks —618

Step 2 of 3 - Legal Entity Names and Beneficial Ownership

* Required

Complete the following information and select Continue to proceed to the next step. —620

| Task | Status |
|---|---|
| Legal Entity Names | Action Required |

Legal Entity Names

Confirm the following information. If a legal entity is missing, contact your Relationship Team. —610

**\*Are these legal entity names correct?**

| | | | | | |
|---|---|---|---|---|---|
| Blue Sky Keyboards LLC | ○ Yes | ● No | Centrex Enterprise | ● Yes | ○ No |
| Cartoons Now | ● Yes | ○ No | Creative Plastics | ● Yes | ○ No |
| CCP NewCo LLC | ● Yes | ○ No | Tom's Restaurant | ● Yes | ○ No |

⚠ Your Relationship Team will contact you to update all incorrectly named Legal Entities. You must also download and complete a new Change Request form provided at the end of this review.

By Selecting Continue, you confirm that your review of the provided legal entity information is accurate.

[Continue] [Clear] —616

| Beneficial Ownership Information (4 Legal Entities) | Action Required |
| Beneficial Ownership Information (1 Legal Entities) | Action Required |

Cancel —614

Sidebar (602):
- Review and Confirm
- Support
- Periodic Review Support Center
  - Telephone
  - Email address
- Help Sign Off —608

FIG. 6A

Compliance Information Request

Review and Confirm for XYZ Corporation

< Return to Compliance Information Request Tasks —618

Step 2 of 3 - Legal Entity Names and Beneficial Ownership —604

*Required

Complete the following information and select Continue to proceed to the next step.

| | Task | Status |
|---|---|---|
| + | Legal Entity Names | Completed ⊘ |
| + | Beneficial Ownership Information (4 Legal Entities) | Action Required |

Beneficial Ownership Information (4 Legal Entities)

Review the Beneficial Ownership information for accuracy, as it relates to the following legal entities. If any Beneficial Owner is missing, contact your Relationship Team. —660

Individuals with Control ⓘ

Legal Name ⟶ 662

Registered Address ⟶ 208

Physical Address ⟶ 208

\* Our records indicate there are no individuals meeting the 25% or more Beneficial Ownership threshold for the listed legal entities. Is this correct ?

| | | | | | |
|---|---|---|---|---|---|
| CCP NewCo LLC | ◉ Yes | ○ No | Creative Plastics | ◉ Yes | ○ No |
| Centrex Enterprise | ◉ Yes | ○ No | Tom's Restaurant | ○ Yes | ◉ No — 208 |

⚠ Your Relationship Team will contact you to update all incorrect Beneficial Ownership information. You must also download and complete a new Certification of Beneficial Owners (COBO) form provided at the end of this review.

[Continue] Clear —666

602

664

608 — Sign Off

Compliance Information Request

Review and Confirm for XYZ Corporation — 604

< Return to Compliance Information Request Tasks

Step 2 - Legal Entity Names(s) and Beneficial Ownership

*Required

Complete the following information and select Continue to proceed to the next step.

| Task | Status |
|---|---|
| Legal Entity Names | Completed ⊘ |
| Beneficial Ownership Information (4 Legal Entities) | Completed ⊘ |
| Beneficial Ownership Information (1 Legal Entities) | Completed ⊘ |

Selecting Confirm and Continue sends your Legal Entity Name and Beneficial Ownership review to Wells Fargo. After continuing to Step 3 the next step, you will not be able to make changes to your Legal Entity Name and Beneficial Ownership review without Wells Fargo Relationship Team assistance.

[ Confirm and Continue ] Cancel
— 674    — 676

Privacy, Security & Legal    Terms of Use

670

---

Review and Confirm — 602

Support

Periodic Review Support Center
☏ Telephone
✉ Email address

Help

Sign Off — 608

FIG. 6C

Review and Confirm for XYZ Corporation

< Return to Compliance Information Requests

Compliance Information Request Tasks — 704

Complete the Customer Due Diligence tasks outlined below

| Task | Status |
|---|---|
| Step 1 - Authorized Person Confirmation | Completed ⊘ |
| Step 2 - Legal Entity Names and Beneficial Ownership | Completed ⊘ |
| Step 3 - Additional Client Information | |
|     Doing Business As — 710 | Action Required |
|     Registered Address | Action Required |
|     Physical Address | Action Required |
|     Associated Address | Action Required |
|     Market Served | Action Required |
|     Legal Ownership | Action Required |
|     Other Related Parties | Action Required |

Compliance Information Requests

Review and Confirm

Support

Periodic Review Support Center
- Telephone
- Email address

Help — 820

Review and Confirm for XYZ Corporation

< Return to Compliance Information Request Tasks — 818

Step 3 of 3 - Additional Client Information — 804

* Required

Complete the following information and select Continue to proceed to the next step. — 810

| Task | | Status |
|---|---|---|
| ⋮ Doing Business As | | Action Required |
| Doing Business As ⓘ | | |
| * Are these the correct Doing Business As names for the following legal entities ? | | |
| Cartoons Now | | |
| MADE Enterprise  ● Yes  ○ No | Happy Enterprise  ● Yes  ○ No | |
| CCP NewCo LLC | | |
| Tourz Enterprise  ● Yes  ○ No | Rainbow Fitness  ● Yes  ○ No | |
| [Continue] Clear — 816 | | |
| ⋄ Registered Address | | Action Required |
| ⋄ Physical Address | | Action Required |
| ⋄ Associated Address | | Action Required |
| ⋄ Market Served | | Action Required |
| ⋄ Legal Ownership Structure | | Action Required |
| ⋄ Other Related Parties | | Action Required |

Cancel — 814

802

812

808 — Sign Off

FIG. 8A

Compliance Information Requests

Review and Confirm for XYZ Corporation

< Return to Compliance Information Request Tasks

*Required

Step 3. Additional Client Information — 804

The following information is currently on record at Wells Fargo. Select "Yes" if the information is accurate, "No" if it is inaccurate.

| Task | Status |
|---|---|
| Doing Business As | Completed ⊘ |
| Registered Address | Completed ⊘ |
| Physical Address | Completed ⊘ |
| Associated Address | Completed ⊘ |
| Market Served | Completed ⊘ |
| Legal Ownership Structure | Completed ⊘ |
| Other Related Parties | Completed ⊘ |

By selecting "Confirm and Submit," I confirm that there are no changes to the beneficial ownership information previously provided and shown above for the entities for which I have selected "Yes."

Confirm and Submit — 874

Privacy, Security & Legal   Terms of Use

Review and Confirm

Support

Periodic Review Support Center
- Telephone
- Email address

Help

802

Sign Off — 808

| | |
|---|---|
| Review and Confirm | |
| Support | |
| Periodic Review Support Center | |
| 📞 Telephone | |
| ✉ Email address | |
| Help | |

Compliance Information Requests

Review and Confirm for XYZ Corporation

🖨 Print

< Return to Compliance Information Requests Tasks

Step 4 of 4 – Documents and Signatures

| Actions items | Submitted items |
|---|---|

Below are items required to be submitted. If item is provided by your Relationship Team, Select Get Item to download. They you can print, complete, sign, and submit it.

▽ Filters

1004

| Item ◇ | Status ◇ | Status Date ◇ | 1 to 50 of 500 items ˅ ⇑⇓ Action ◇ |
|---|---|---|---|
| + Change Request for Blue Sky Keyboards LLC | Requested | XX/XX/XXXX | Select ˅ |
| + Certificate of Beneficial Ownership for Tom's Restaurant | Missing Signature | | Select ˅ |
| − Change Request for Creative Plastics | Requested | XX/XX/XXXX | Select ˅ |

1008

Item Description Request Description

§ Lorem ipsum dolor sit amet, consectetur adipiscing elit. Sed iaculis auctor tempus.

Get item (X MB)

Submit

ⓘ You may continue without submitting all documents, however, after submitting your compliance information, required documents cannot be submitted or removed without Relationship Team assistance.

Selecting Confirm and Submit sends your compliance information to the Provider Institution.
After submitting, you cannot make changes without the Provider Institution Relationship Team assistance.

1074

[Confirm and Submit]  Cancel

Sign Off

FIG. 10

Compliance Information Requests

Review and Confirm for XYZ Corporation

< Return to Compliance Information Requests

Task Status Summary 1104

Date Submitted 07/31/2019

Your Compliance Information Request has been submitted. Review your results responses below.

| Legal Entity | Form Needed | Due Date | Action |
|---|---|---|---|
| Blue Sky Keyboards LLC | Change Request | 07/21/2019 | [Download] |
| Tom's Restaurant | Certification of Beneficial Ownership (COBO) | 07/21/2019 | [Download] |
| Creative Plastics | Change Request | 07/21/2019 | [Download] |

1106

Review and Confirm

Support

Periodic Review Support Center
- Telephone
- Email address

Help

Submitted Items

Below you will find items that have been submitted.

| Item |
|---|
| Certificate of Limited Partnership |
| Corporate Governance Document |
| Formation Document |
| Government Issued Business/DBA License or Trade Name Certificate |
| Government Issued ID |
| HRA Form/Relationship Memo/High-Risk Documentation |
| Internal/Process Form |
| Non-US Government Entity Documentation |
| Partnership or Limited Partnership Agreement |
| Printout from Approved Source |
| Proof of Regulation |
| Tax/SEC |
| Trust Agreement/Certification |
| USA PATRIOT Act Certification |
| Will or Letter of Administration |
| Wolfsberg Questionnaire or AML/FIG Questionnaire |

1200

[Close Summary] — 1202

FIG. 12

SYSTEMS AND METHODS FOR STORING AND VERIFYING DATA

CROSS-REFERENCE TO RELATED PATENT APPLICATION

This application claims the benefit of and priority to U.S. Provisional Patent App. No. 63/009,878, filed Apr. 14, 2020, the contents of which incorporated herein by reference in its entirety.

BACKGROUND

Provider institutions, such as financial institutions, can maintain information relating to other entities, such as customers of the provider. In some instances, a provider may be required to collect and store such third-party information in order to comply with laws and other regulations. The information may change over time, making previously stored information inaccurate. As a result, it can be useful to periodically update or verify stored information. It can be difficult to coordinate the exchange of such information and verification data between the provider and the other entities.

SUMMARY

At least one aspect of this disclosure is directed to a system. The system can include a provider institution accounts database structured to retrievably store data corresponding to a plurality of entities including a primary entity related to at least one secondary entity. The data for each of the plurality of entities can include values for a plurality of fields associated with the respective entity. The system can also include a data management circuit configured to detect that one or more fields corresponding to the at least one secondary entity has a value which is to be updated. The data management circuit can generate, responsive to detecting that the value is to be updated, a first user interface for rendering at a user device for a user associated with the primary entity. The first user interface can cause the user to confirm authorization to provide the value for the one or more fields corresponding to the at least one secondary entity. The data management circuit can generate, responsive to the user confirming authorization, a second user interface including a field for receiving the value. The data management circuit can receive, from the user device, the value provided via the second user interface for the field and update the data corresponding to the at least one secondary entity in the provider institution accounts database using the value received from the user device.

At least one aspect of this disclosure is directed to a method. The method can include maintaining, by a provider institution accounts database, data corresponding to a plurality of entities including a primary entity related to at least one secondary entity. The data for each of the plurality of entities can include values for a plurality of fields associated with the respective entity. The method can include detecting, by a data management circuit, that one or more fields corresponding to the at least one secondary entity has a value which is to be updated. The method can include generating, by the data management circuit responsive to detecting that the value is to be updated, a first user interface for rendering at a user device for a user associated with the primary entity. The first user interface can cause the user to confirm authorization to provide the value for the one or more fields corresponding to the at least one secondary entity. The method can include generating, by the data management circuit responsive to the user confirming authorization, a second user interface including a field for receiving the value. The method can include receiving, by the data management circuit from the user device, the value provided via the second user interface for the field and updating, by the data management circuit, the data corresponding to the at least one secondary entity in the provider institution accounts database using the value received from the user device.

At least one aspect of this disclosure is directed to a non-transitory computer readable medium. The non-transitory computer readable medium can have computer-executable instructions embodied therein that, when executed by a data management circuit of a provider institution computing system, can cause the provider institution computing system to perform operations to store and verify data. The operations can include maintaining, by a provider institution accounts database, data corresponding to a plurality of entities including a primary entity related to a plurality of secondary entities. The data for each of the plurality of entities can include values for a plurality of fields associated with the respective entity. The operations can include detecting that one or more fields corresponding to at least one of the plurality of secondary entities has a value which is to be updated. The operations can include generating, responsive to detecting that the value is to be updated, a first user interface for rendering at a user device associated with the primary entity. The first user interface can cause the user to confirm authorization to provide the value for the one or more fields corresponding to the at least one secondary entity. The operations can include generating, responsive to the user confirming authorization, a second user interface including a field for receiving the value. The operations can include receiving, from the user device, the value provided via the second user interface to the field and updating the data corresponding to the at least one secondary entity in the provider institution accounts database, using the value received from the user device.

BRIEF DESCRIPTION OF THE FIGURES

FIGS. 3A-3C depict exemplary user interfaces, according to an example embodiment.

FIGS. 4A and 4B depict exemplary user interfaces, according to an example embodiment.

FIGS. 6A-6C depict exemplary user interfaces, according to an example embodiment.

FIG. 7 depicts an exemplary user interface, according to an example embodiment.

FIGS. 8A and 8B depict exemplary user interfaces, according to an example embodiment.

FIG. 10 depicts an exemplary user interface, according to an example embodiment.

FIG. 11 depicts an exemplary user interface, according to an example embodiment.

FIG. 12 depicts an exemplary user interface, according to an example embodiment.

DETAILED DESCRIPTION

Figure 1:
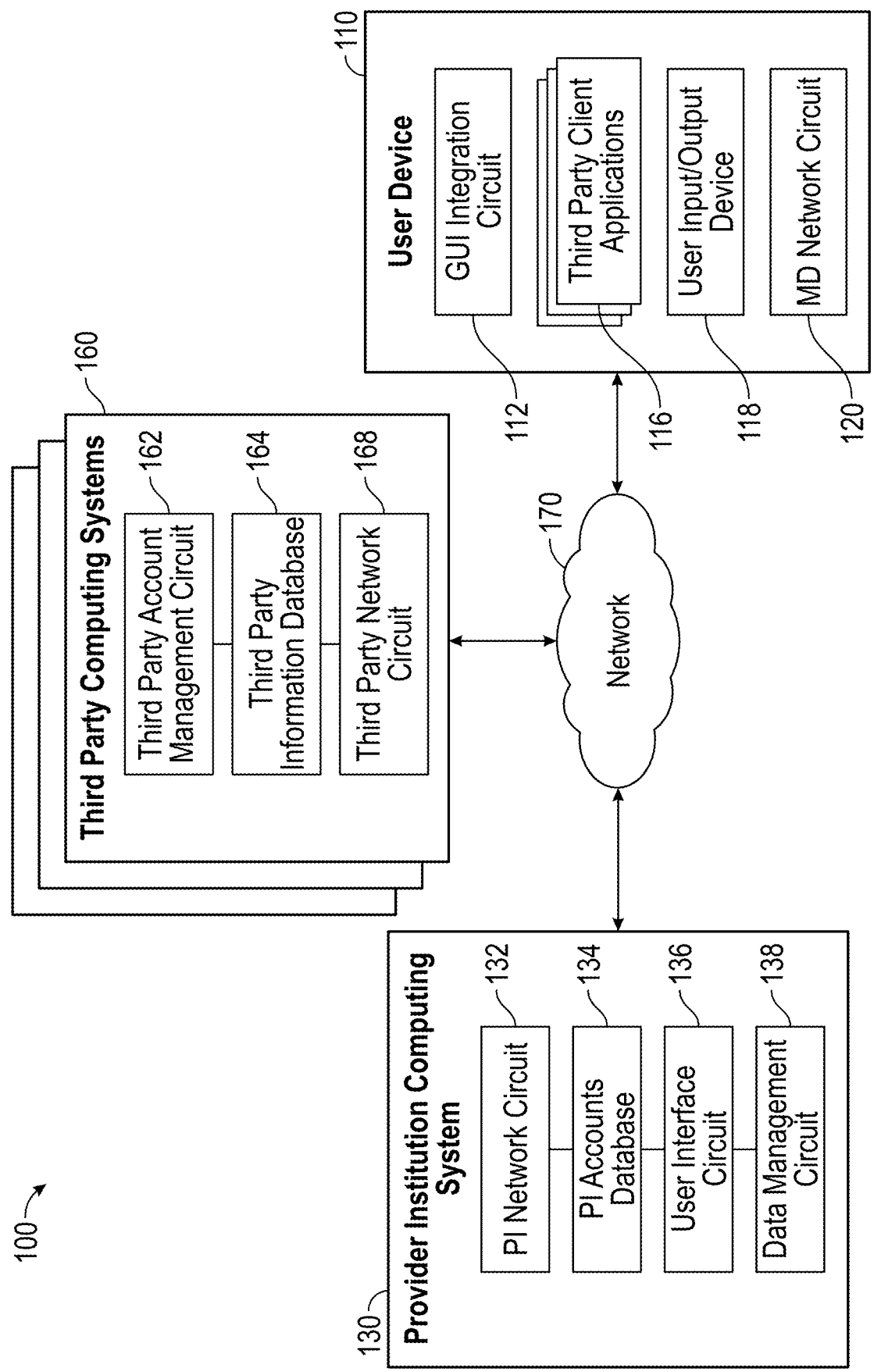
FIG. 1 is a block diagram of a system for providing a dynamic user interface for storing and verifying data, according to an example embodiment.

Various embodiments discussed herein relate to systems and methods for providing a dynamic user interface for storing and verifying data. In various embodiments, the user interface can be provided by a provider institution to another entity. For example, the other entity may be a customer of the provider institution. A user device associated with the entity may communicate with the provider institution using a computer network via any number of channels or platforms, for example. The provider institution may transmit data corresponding to a graphical user interface across the network to the user device associated with the entity, which may display the graphical user interface on a display screen. The user interface can include a series of screens to guide a user of the user device through a process of providing and verifying stored information. The provider institution can receive inputs from the user device via the user interface. Based on the inputs, the provider institution can store, verify, and update information known to the other entity. In some arrangements, the user device may access the user interface on a periodic basis, and information can be stored and verified each time the user device interacts with the user interface. As a result, the information stored by the provider institution can be stored and verified to be accurate over time.

In some arrangements, the information maintained by the provider institution can be information required by law or regulation to be stored by the provider institution. For example, certain information relating to customers of the provider institution, which may correspond to the entities described above that may communicate with the provider institution via a computer network, can be required to be collected and stored by the provider institution in order to reduce a likelihood of suspicious or fraudulent transactions. In some arrangements, such information can include information identifying the customer (e.g., identity information for a person or entity that maintains an account with the provider institution) or identity information for a beneficial owner, which may be any entity on whose behalf an account is maintained at the provider institution. A user associated with the entity can access the graphical user interface displayed on a user device, as described above. Using the graphical user interface, the user can enter, edit, and verify information for storage by the provider institution. As a result, any required information and documentation can be easily collected, updated, and verified to accurately reflect any changes that may occur over time, without the need for the entity to provide complex paperwork.

As used herein, the term "field" refers to a portion of a user interface viewable by the user on a user mobile device. Any interface viewable on a mobile device display may include any number of fields. Fields may be completely separate portions of the user interface or may be overlapping with one another. Any field may contain any number of elements such as headers, graphics, icon, information, and the like.

As used herein, the term "interaction point" refers to an element on a user interface on a user mobile device that the user can interact with (e.g., by pressing the screen in a position corresponding to the interaction point or swiping the screen) to induce a responsive action by the user mobile device (e.g., button(s), icon(s), switch(es), alpha-numeric text, hyperlinks, etc.). For example, the user may interact with one interaction point to cause the user mobile device to present another user interface containing information different from the interface initially containing the interaction point.

Referring now to FIG. 1, a block diagram of a computer-implemented system 100 for providing a dynamic user interface for storing and verifying data is shown, according to an example embodiment. As shown, the system 100 includes a user device 110 associated with an entity, a provider institution computing system 130 associated with a provider such as a financial institution, and one or more third party computing systems 160 associated with various third parties. The various systems and devices may be communicatively and operatively coupled through a network 170, which may include one or more of the Internet, cellular network, Wi-Fi, Wi-Max, a proprietary banking network, or any other type of wired or wireless network or a combination of wired and wireless networks. As described herein, the system 100 may be used to facilitate collection, verification, and storage of data provided by the user device 110.

Third party computing systems 160 are computing systems associated with various third parties. As used herein with respect to third party computing systems 160, "third parties" refer to organizations that may also store information related to the entity associated with the user device 110. For example, the third party computing systems 160 can include regulators, government agencies, law enforcement agencies, financial institutions, and the like.

Third party computing systems 160 include a third party account management circuit 162, a third party information database 164, and a third party network circuit 168 that enables the third party computing system 160 to exchange data, information, values, and the like over the network 170. The third party information database 164 is structured to retrievably store user information relating to user relationships with the third party, and may include non-transient data storage mediums (e.g., local disc or flash-based hard drives, local network servers, and the like) or remote data storage facilities (e.g., cloud servers). Third party information database 164 may include information pertaining to user accounts or other record information with the third party. The information stored in the third party information database 164 can vary depending on the particular service provided by the third party computing system 160.

The third party account management circuit 162 can be structured to provide the user with access to the third party computing system 160. For example, the third party account management circuit can manage one or more of the user's accounts (or accounts of an entity associated with the user, such as the user's employer). As will be appreciated, the functionalities performed by the third party account management circuit 162 will vary depending on the nature of the service provided at the third party computing system 160. In some embodiments, the third party account management circuit 162 is configured to provide an application (e.g., a third party client application 116, described in greater detail below) on various user mobile devices 110. The application may provide users with various displays enabling the users to take advantage of the various functionalities provided by the third party computing systems 160.

The provider institution computing system 130 can be a computing system at an organization such as a financial institution that provides and maintains one or more accounts, which may include financial accounts (e.g., demand deposit account, credit or debit card account, brokerage account, etc.) on behalf of the user. In some arrangements, the provider institution can be an issuer of a payment vehicle held by the user. In the context of the present disclosure, the provider institution can include commercial or private banks, credit unions, investment brokerages, mobile wallet providers, and so on, but can also include any commercial entity capable of maintaining payment vehicles on behalf of a user, including retailers, vendors, service providers, and the like. In some embodiments, the user device 110 may access the provider institution computing system 130 to receive and/or update information relating to accounts maintained by the provider institution computing system 130. The user device 110 may access the provider institution computing system 130 via any number of modalities, channels, platforms, or the like.

The provider institution computing system 130 includes a provider institution network circuit 132 enabling the provider institution computing system 130 to exchange data over the network 170, a provider institution accounts database 134, a user interface circuit 136, and a data management circuit 138. In some arrangements, the user interface circuit 136 may, for example, include an API that facilitates the delivery of account information, identity information, or other information for display at the user device 110. The financial institution accounts database 134 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 134 may include personal information (e.g., names, addresses, phone numbers, and so on), beneficial ownership information, authentication information (e.g., username/password combinations, device authentication tokens, security question answers, unique customer identifiers, etc.), and financial information (e.g., token information, account numbers, account balances, available credit, credit history, transaction histories, and so on) relating to the various users and associated financial accounts.

The data management circuit 138 is structured to collect, update, and verify information received from a user of the user device 110. For example, the data management circuit 138 can collect, update, and verify information based on inputs received from the user device 110 via the network 170. In some arrangements, the data management circuit 138 is configured to generate a graphical representation of various interfaces to prompt a user of the user device 110 to provide or verify data. The graphical representation may be encoded with hypertext that facilitates the user of the user device 110 communicating responses to various prompts to the provider institution computing system 130 over the network 170.

In some embodiments, the provider institution accounts database 134 stores data corresponding to a plurality of entities, including a primary entity related to a plurality of secondary entities. The data for each entity includes values for a plurality of fields associated with the respective entity. For example, a field can be for any information that relates to the entity (e.g. legal entity name, beneficial ownership information, address, etc.). The data management circuit 138 may generate a preliminary user interface including a selectable button which when selected, allows the user to view information that has previously been entered (e.g., data which is stored in the provider institution accounts database 134 in association with a respective entity or entities). The data management circuit 138 may be configured to detect that one or more fields corresponding to at least one of the entities has a value that needs to be updated (e.g., based on an existing or prior value being stale, null, empty, and so forth). The value can be words, letters, numbers, symbols, selections, etc. For example, if an entity does not have its legal name entered, or the name is entered wrong (or is stale), the value (here, referring to the legal name) needs to be updated. There can be one or more fields that may need to be updated. The data management circuit 138 may inspect, analyze, or parse the data from the accounts database 134 to detect empty or stale values (such as values which have not been updated for a predetermined duration from their first entry).

As described in greater detail below, responsive to detecting that a value (or values) is to be updated, the data management circuit 138 may be configured to generate a first user interface which prompts a user to confirm they have authorization to provide the values for the fields that are to be updated for each respective entity. The data management circuit 138 may generate the first user interface for rendering at a first user device associated with a primary entity corresponding to the secondary entity (or entities) having the value(s) to be updated. The user may be authorized to provide such values for some, all, one, or none of the secondary entities. With authorization for at least one secondary entity 330, the data management circuit 138 generates a second user interface, including a field for receiving a value. The user inputs a value and the data management circuit 138 receives the value and updates the corresponding value in the provider institution database.

In some embodiments, if there are several fields that need updating, the data management circuit 138 may organize those fields into tasks. The data management circuit 138 generates a different user interface for every task that the user needs to complete and the tasks must be completed in order. For example, a second task has to be done via its corresponding user interface before a third task can be done via a different corresponding user interface. Each task can have a corresponding status indicating whether the user still needs to provide additional values relating to each individual task. Each task is completed by the user inputting a value. A value is input via the user interface by a variety of methods: manually entering words, selecting buttons, selecting toggle buttons, etc.

After all the tasks are completed, the data management circuit 138 may generate a summary user interface displaying the entities that had values that needed updating and a selectable download button for each entity. The selectable download button, when selected, provides one or more forms needed for the corresponding entity.

The user device 110 is a mobile device associated with a user, who may be a member of an entity authorized to act on behalf of the entity. For example, the user may include one or more individuals, business entities, government entities, and agents. The user device 110 is structured to exchange data over the network 170, execute software applications, access websites, generate graphical user interfaces, and perform other operations described herein. The user device 110 may include one or more of a smartphone or other cellular device, a wearable computing device (e.g., eyewear, a watch or bracelet, etc.), a tablet, a portable gaming device, a laptop, a desktop, a server, or a portable computing devices.

The user device 110 includes a graphical user interface (GUI) integration circuit 112, third party client applications 116, a user input/output ("I/O") device 118, and a mobile device network circuit 120 enabling the user mobile device to exchange information over the network 170. The user I/O device 118 includes hardware and associated logic configured to enable the user device 110 to exchange information with a user and other devices (e.g., a merchant transaction terminal). An input aspect of the user I/O device 118 allows the user to provide information to the user device 110, and may include, for example, a mechanical keyboard, a touchscreen, a microphone, a camera, a fingerprint scanner, any user input device engageable to the user device 110 via a USB, serial cable, Ethernet cable, and so on. An output aspect of the user I/O device 118 allows the user to receive information from the user device 110, and may include, for example, a digital display, a speaker, illuminating icons, LEDs, and so on. The user I/O device 118 may include systems, components, devices, and apparatuses that serve both input and output functions, allowing the provider institution computing system 130 exchange information with the user device 110. Such systems, components, devices and apparatuses include, for example, radio frequency transceivers (e.g., RF or NFC-based transceivers) and other short range wireless transceivers (e.g., Bluetooth©, laser-based data transmitters, etc.).

The user device 110 further includes a GUI integration circuit 112. The GUI integration circuit 112 is structured to present, control, and otherwise manage displays or graphical user interfaces on the user device 110 including information pertaining to data requested by the provider institution computing system 130. For example, the GUI integration circuit 112 may present the user with displays enabling the user to input information pertaining to various payment vehicles. The screens may enable the user to manually input information in response to various prompts. The mobile GUI integration circuit 112 may then process the information input by the user, and transmit the information to the provider institution computing system 130 for storage (e.g., in the PI accounts database 134 in association with the user). In some arrangements, the GUI management circuit can be or can include a web browser configured to display a web-based user interface provided by the provider institution computing system 130. Additional aspects of the interfaces that can be displayed on the user device 110 by the GUI integration circuit 112 are described further below.

Third party client applications 116 are structured to provide the user with access to services offered by various third parties. In some arrangements, the third party client applications 116 are hard coded onto the memory of the user device 110. In another embodiment, these applications are web-based interface applications, where the user has to log onto or access the web-based interface before usage, and these applications are supported by a separate computing system comprising one or more servers, processors, network interface circuits, or the like (e.g., third party computing systems 160), that transmit the applications for use to the mobile device.

In some arrangements, the third party client applications 116 are structured to permit management of at least one user account associated with a third party service. Accordingly, a particular third party client application 116 may be communicably coupled to a third party computing system 160 (e.g., the third party information database 164) via the network 170. Through this communicative coupling, the third party computing system 160 (e.g., via the third party account management circuit 162) may provide displays regarding the particular third party service or application (e.g., account balance information).

Figure 2:
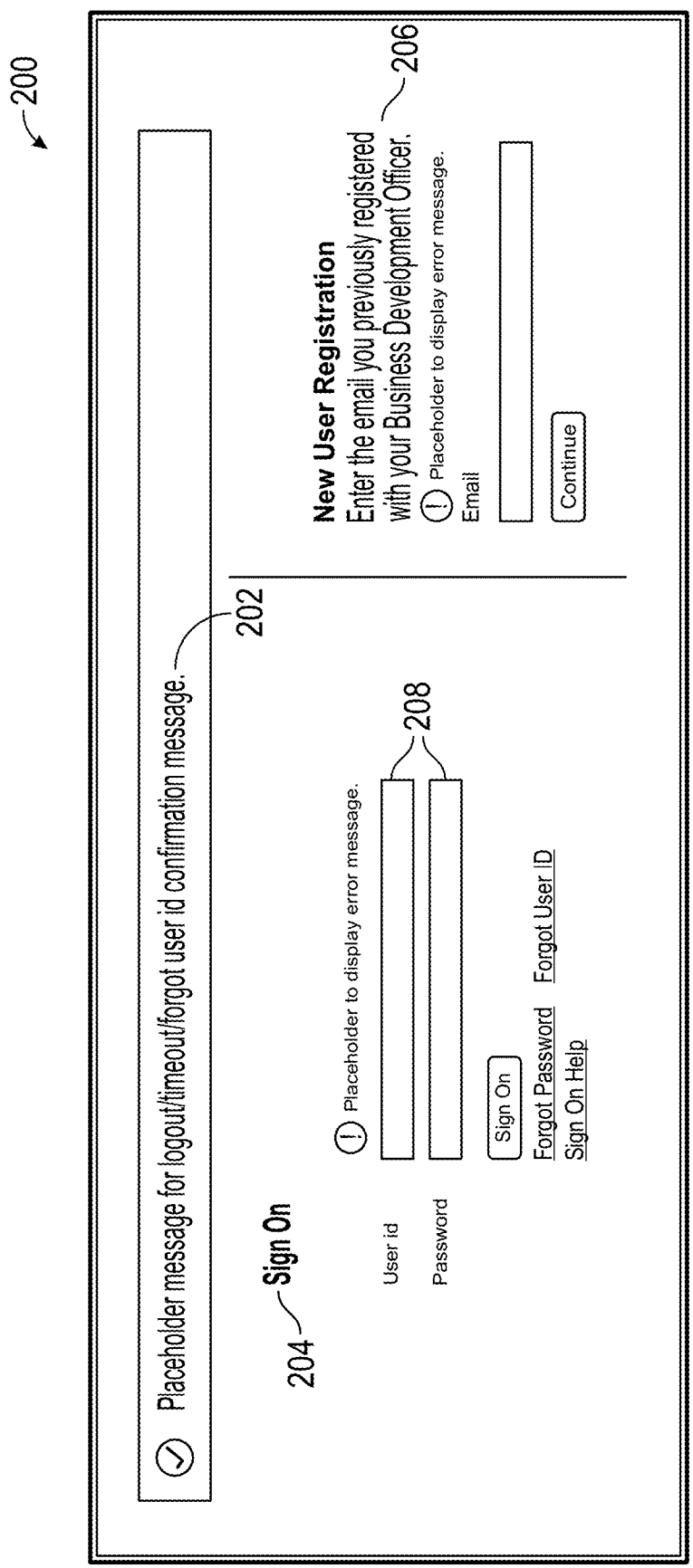
FIG. 2 depicts an exemplary user interface, according to an example embodiment.

Referring now to FIG. 2, an exemplary user interface 200 is shown according to an example embodiment. The interface 200 may be presented to a user of the user device 110 to enable the user to provide or verify information to be stored by the provider institution computing system 130. The interface 200 may be presented on the user device 110 while the user device 110 is implementing a web browser. As shown, the interface 200 requests information from the user. The interface 200 includes a message display area 202, a sign on area 204, and a new user registration area 206. The sign on area 204 includes fields 208 for entering a username and a password. The user can provide information in each of these fields 208, for example via the user input/output device 118. For example, if the user has an existing account, the user can provide information corresponding to the username and password for the existing account in the fields 208 of the sign on area 204. The user can then select the "Sign On" button, which can cause the user device 110 to transmit the entered information over the network 170 to the provider institution computing system 130. The user may alternatively select the "Forgot Password" link or the "Forgot User ID" link to be directed to a different user interface for recovering this information.

If the user has not yet registered an account, the user may enter an email address in the email field 208 of the new user registration area 206. Selecting the Continue button in the new user registration area can then cause the user device 110 to transmit the entered email address to the provider institution computing system 130 via the network 170.

The message display area 202 can be reserved for displaying various messages to the user. For example, selecting the "Sign On Help" link may cause directions to be displayed in the message display area 202 to instruct the user on how to complete the sign on process. If the user inputs credentials that cannot be authenticated in the fields 208 of the sign on area 204, a message indicating such can be displayed in the message display area 202. It should be understood that the text shown in FIG. 2 in the message display area 202 is illustrative only to indicate that the message display area 202 is reserved, and may not actually be shown to a user of the user device 110.

Referring now to FIG. 3A, an exemplary user interface 300 is shown according to an example embodiment. The interface 300 may be presented to a user of the user device 110 after the user logs in, for example via the user interface 200 shown in FIG. 2. The interface 300 includes a navigation pane 302 on the left hand side and a content area 304 to the right of the navigation pane 302. The interface 300 also includes a footer area 306 below the content area 304. The navigation pane 302 includes a menu button in the upper left hand corner. Selecting the menu button can cause a list of navigational items to be displayed in the navigation pane 302. The navigation pane 302 can also display support information such as a telephone number and email address that can be accessed to provide additional support. The navigational pane 302 also includes a "Review and Confirm" link. Upon selection of the "Review and Confirm" link, information can be displayed in the content area 304, as described further below. Sign Off buttons 308 are located in the lower portion of the navigation pane 302 as well as the top right hand corner of the interface 300. The footer area 306 can include links that may be selectable by a user to display information relating to privacy, security, terms of use, or other information.

Figure 3B:
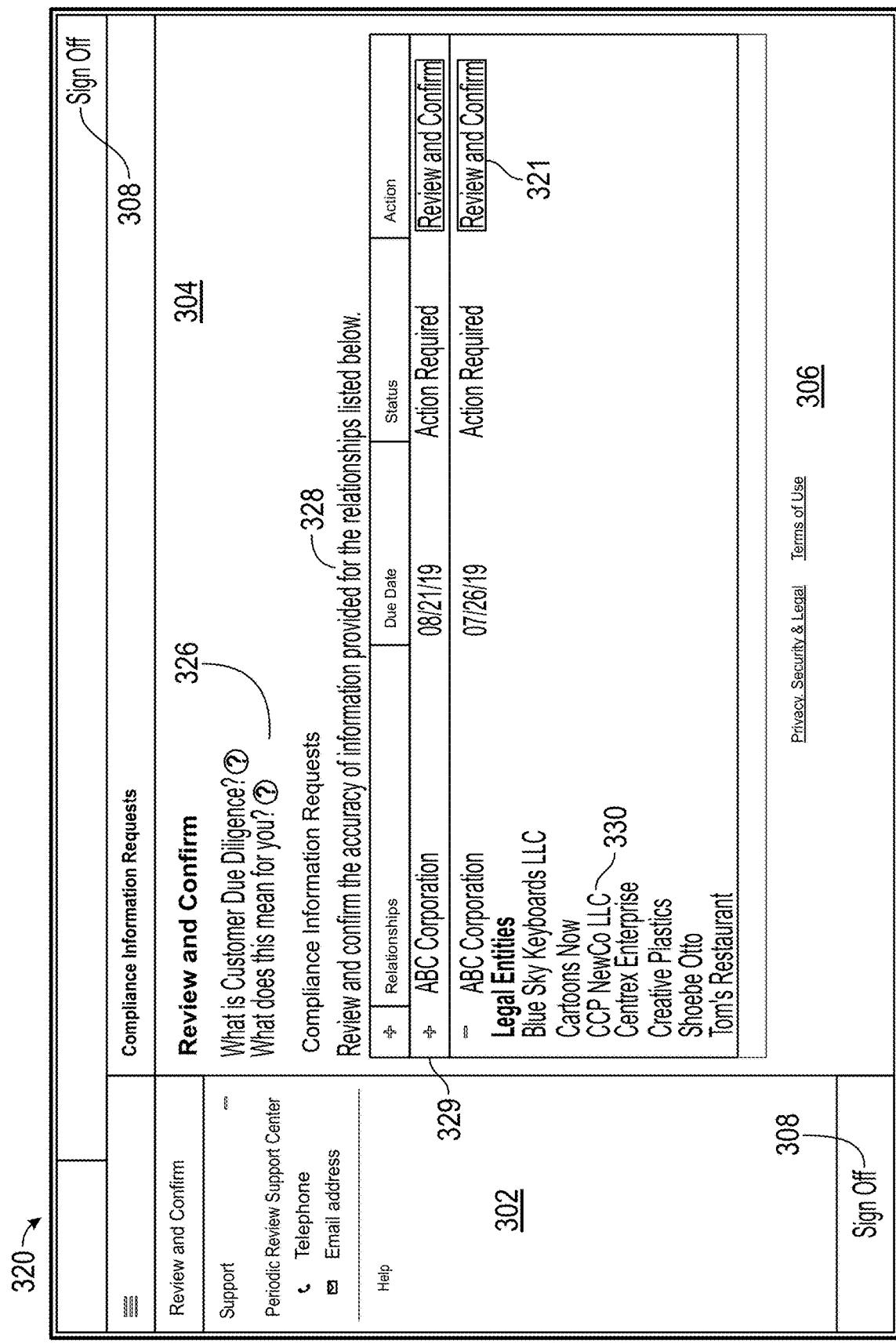

Referring now to FIG. 3B, an exemplary preliminary user interface 320 is shown according to an example embodiment. In some arrangements, the preliminary user interface 320 can be similar to the user interface 300 of FIG. 3A, but may include additional information displayed in the content area 304. For example, the information in the content area 304 of the preliminary user interface 320 can be displayed upon selection of the Review and Confirm link in the navigational pane 302 of the interface 300. The displayed content includes an informational area 326 and a Compliance Information Requests area 328. The informational area 326 includes help buttons that the user may select with a pointing device to display contextual help or instructions.

The Compliance Information Requests area 328 displays information in tabular form. Each row of information can correspond to a primary entity associated with the user. For example, the rows may correspond to entities that are subsidiaries of a primary entity that the user represents as an agent. For each entity represented by a row in the Compliance Information Requests area 328, columns are displayed to show relationship information, due date information, and status information. A Review and Confirm button is also provided in an Action column for each entity. Selecting the plus icon for an entity can show expended information, such as other legal entities that are associated with the entity. For example, as shown in FIG. 3B, the entity XYZ Corporation is associated with seven other entities, including Blue Sky Keyboards LLC, Cartoons Now, etc. In some arrangements, these entities can share common ownership with XYZ Corporation. Selection of the Review and Confirm button for an entity can allow the user to initiate the process of providing or verifying requested information related to that entity and any associated entities.

Referring now to FIG. 3C, an exemplary user interface 340 is shown according to an example embodiment. In some arrangements, the interface 340 can be similar to the preliminary user interface 320 of FIG. 3B, but may include additional information displayed in the content area 304. The information in the content area 304 of the interface 340 can be displayed if compliance information has already been entered for an entity (in this example, the entity is XYZ Corporation). The interface 340 can include a Select button 342. In some implementations, the Select button 342 can be unavailable (e.g., not displayed, displayed but not selectable, etc.) if no compliance information has yet been entered. Clicking the Select button 342 can cause a sub-menu 344 to be displayed with additional options, including a Download Summary option and a View Summary option. Summary information can include any information that has already been entered for the entity as part of the compliance request, and the summary information can be viewed or downloaded by selecting the corresponding option from the sub-menu 344.

Referring now to FIG. 4A, an exemplary first user interface 400 is shown according to an example embodiment. In some arrangements, the first user interface 400 can be displayed upon selection of the Review and Confirm button in the Action column for an entity (in this example, the entity is XYZ Corporation) in the interface 320 of FIG. 3B. The first user interface 400 can allow a user to confirm that the user is authorized to provide information on behalf of the entities displayed, for example, in the user interface 320 of FIG. 3B.

The first user interface 400 includes a Return link 402. Selecting the Return link 402 can return the user to a previous interface. For example, selecting the Return link 402 can cause the interface 320 of FIG. 3B or the interface 340 of FIG. 3C to be displayed again. The first user interface 400 also includes an instructional information portion 404. The instructional information portion 404 can provide directions to the user for completing form information displayed in an authorization confirmation portion 406 of the first user interface 400 displayed below the instructional information portion 404. The first user interface 400 can also include help buttons 408 that the user may select with a pointing device to display contextual help or additional information relating to the terms "authorized person" and "legal entity customer." The first user interface 400 also includes an identification portion 410 that displays a legal name and title of the user.

The authorization confirmation portion 406 of the first user interface 400 displayed a list containing the entities corresponding to the selected row from the interface 320 of FIG. 3B. In this example, the user has selected the "Review and Confirm" button for XYZ Corporation in the user interface 320. As a result, the legal entities for XYZ Corporation are displayed in authorization confirmation portion 406 of the first user interface 400 shown in FIG. 4A. For each entity, a respective Yes toggle button and No toggle button are displayed. The user can select one of the toggle buttons for each legal entity in the authorization confirmation portion 406 of the first user interface 400, depending on whether the user is or is not the Authorized Person for each entity.

The first user interface 400 also includes a Continue button 412 and a Cancel button 414. Before a selection of one toggle button for every entity shown in the authorization confirmation portion 406 of the first user interface 400 is selected, the Continue button 412 can be "greyed out" or otherwise displayed in a manner that indicates that the Continue button 412 is not yet selectable by the user. After a selection has been made of one toggle button for every entity shown in the authorization confirmation portion 406, the Continue button 412 may be shown in a selectable manner, as shown in FIG. 4B. Selecting the Cancel button 414 can cause the information represented by the toggle buttons to be discarded without being saved, and a previous interface screen (e.g., the interface 320 of FIG. 3B) to be displayed. Selecting the Continue button 412 can cause the user device 110 to transmit the information represented by the selected toggle buttons to the provider institution computing system 130 via the network 170. The provider institution computing system 130 can store the information for later retrieval. In addition, a subsequent interface screen can be displayed to the user.

Figure 5:
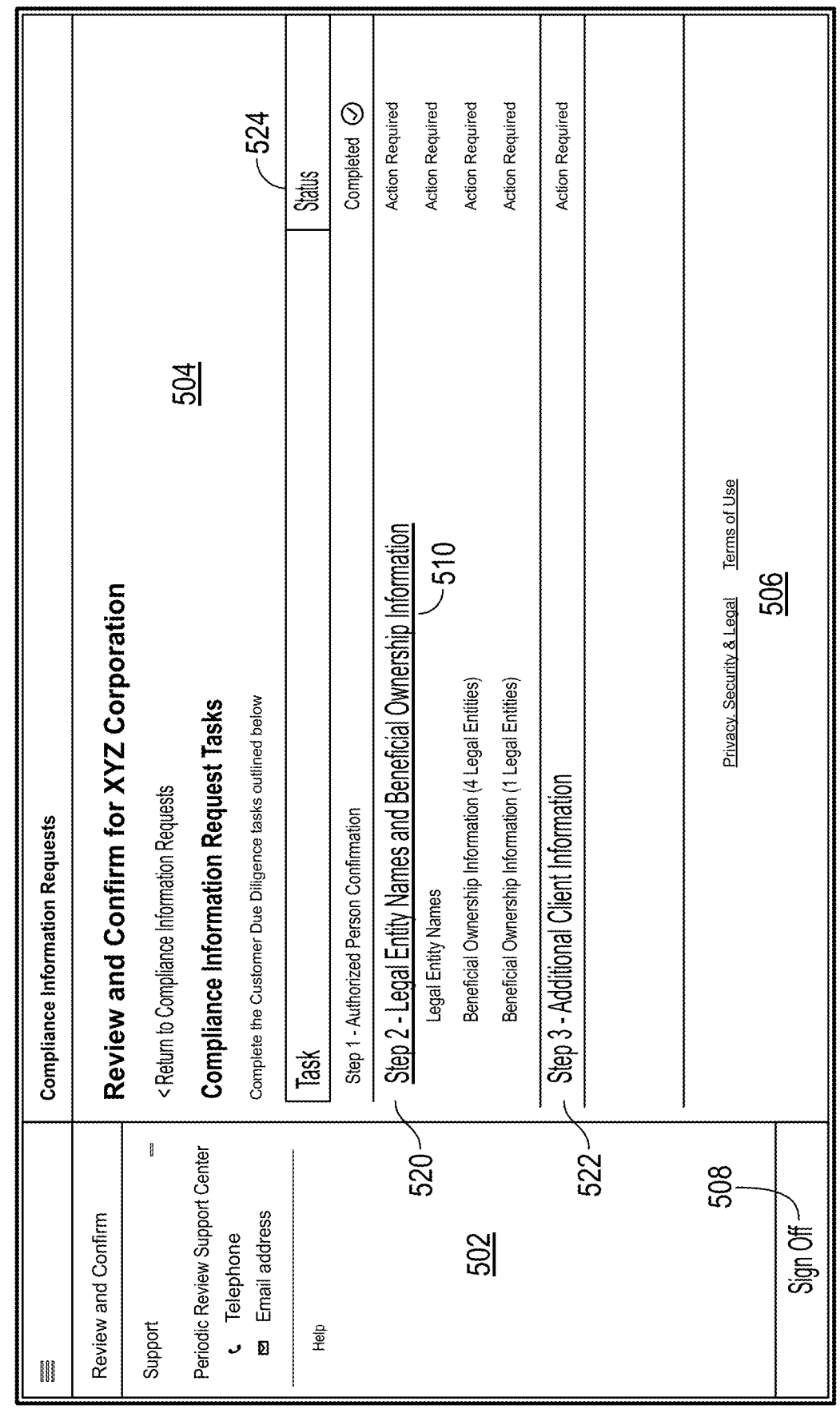
FIG. 5 depicts an exemplary user interface, according to an example embodiment.

Referring now to FIG. 5, an exemplary user interface 500 is shown according to an example embodiment. In some arrangements, the interface 500 can be displayed upon selection of the Continue button 412 in the first user interface 400 of FIGS. 4A and 4B. The interface 500 can allow a user to proceed to a second step of the process for reviewing and confirming compliance information for a selected entity (e.g., XYZ Corporation).

The interface 500 includes a layout and features similar to those of the interface 300 shown in FIG. 3A. For example, the interface 500 includes a navigation pane 502 on the left hand side and a content area 504 to the right of the navigation pane 502. The interface 500 also includes a footer area 506 below the content area 504. The navigation pane 502 includes a menu button in the upper left hand corner. Selecting the menu button can cause a list of navigational items to be displayed in the navigation pane 502. The navigation pane 502 can also display support information such as a telephone number and email address that can be accessed to provide additional support. A Sign Off button 508 is located in the lower portion of the navigation pane 302. The footer area 306 can include links that may be selectable by a user to display information relating to privacy, security, terms of use, or other information.

The content area 504 displays a table showing tasks and associated status 524 for each task. For example, a first task labeled "Step 1—Authorized Person Confirmation" can be marked with a "Completed" status, because the user has previously completed this step via the first user interface 400 shown in FIGS. 4A and 4B. A second task 520 labeled "Step 2—Legal Entity Names and Beneficial Ownership Information" can be represented with a selectable link 510. In addition, subtasks related to this task can automatically be displayed beneath and labeled with a status 524. Initially the status 524 is an "Action Required" status to indicate that the user must take action on these tasks in order to advance the process. A third task 522 labeled "Step 3—Additional Client Information" can also be displayed. However, in the example of FIG. 5, the Step 3 task is not represented with any user selectable link or button. Thus, the only user selectable task is Step 2, thereby ensuring that the user cannot begin a subsequent task until the task corresponding to Step 2 is completed. In some arrangements, the user must complete every subtask of Step 2 before proceeding to Step 3. While FIG. 5 illustrates 3 distinct tasks, Step 1, Step 2, and Step 3, in various other examples the interface 500 may include additional tasks (e.g., Step 4), or less than three tasks.

Referring now to FIG. 6A, an exemplary second user interface 600 is shown according to an example embodiment. In some arrangements, the second user interface 600 can be displayed upon selection of the selectable link 510 for the task of Step 2 in the interface 500 of FIG. 5. 5. The second user interface 600 can allow a user to complete the first subtask of Step 2 by reviewing and confirming legal entity names and beneficial ownership information. The second user interface 600 includes a layout and some features similar to those of the interface 500 shown in FIG. 5, and like reference numerals refer to like elements. For example, the second user interface 600 includes a navigation pane 602 on the left hand side and a content area 604 to the right of the navigation pane 602. The second user interface 600 also includes a Sing Off button 608 in the lower left hand corner.

The content area 604 displays information relating to legal entity names for the selected entity (in this example, XYZ Corporation). The content area includes an instructional area 610 that displays directions to the user for completing form information displayed below. For each legal entity, a name is displayed along with a respective Yes toggle button and No toggle button. The user can select either the Yes toggle button or the No toggle button for each legal entity, depending on whether or not the displayed legal entity names are correct. The second user interface 600 also includes a Continue button 612 and a Cancel button 614. Before a selection of one toggle button for every entity shown in the second user interface 600 is selected, the Continue button 612 can be "greyed out" or otherwise displayed in a manner that indicates that the Continue button 612 is not yet selectable by the user.

After a selection has been made of one toggle button for every entity shown in the second user interface 600, the Continue button 612 may be shown in a selectable manner, as shown in FIG. 6A. Selecting the Cancel button 614 can cause the information represented by the toggle buttons to be discarded without being saved, and a previous interface screen (e.g., the interface 500 of FIG. 5) to be displayed. In some arrangements, a warning may be displayed to the user upon selection of the Cancel button 614 to inform the user that the user's selections will not be saved unless the user selects the Continue button 612. Selecting the Continue button 612 can cause the user device 110 to transmit the information represented by the selected toggle buttons to the provider institution computing system 130 via the network 170. The provider institution computing system 130 can store the information for later retrieval. In addition, a subsequent interface screen can be displayed to the user. In some arrangements, for entities whose legal names are indicated as not correct using the toggle buttons, the user may also be prompted to input correct information, for example by entering text in one or more text fields 662, in the same second user interface 600 or in a different interface.

The second user interface 600 also includes a Clear button 616. Selecting the Clear button 616 can cause any toggle button selections to be deleted. However, the second user interface 600 can remain displayed and the user may again proceed to select the correct toggle button for each respective legal entity. To return to the previous interface (e.g., the interface 500 of FIG. 5), the user may select the Return link 618. In some arrangements, selecting the Return link 618 can cause the user device 110 to transmit the information represented by any selected toggle buttons to the provider institution computing system 130 via the network 170. The provider institution computing system 130 can store the information for later retrieval, and can then transmit to the user device 110 information corresponding to the previous display screen. Subsequently, if the user returns to the second user interface 600, the provider institution computing system 130 can prepopulate the toggle buttons with the previous user selections so that the user's work is saved. The second user interface 600 also includes an Expand All button 620 that can expand rows for all subtasks. In some arrangements, subtasks other than the currently active subtask can be expanded in a "greyed out" or "read only" manner so that the user can see information related to the other subtasks but cannot interact with the other subtasks. Selecting the Continue button 612 can cause a subsequent interface to be displayed, as described above.

Referring now to FIG. 6B, an exemplary user interface 650 is shown according to an example embodiment. In some arrangements, the interface 650 can be displayed upon selection of the Continue button 612 in the second user interface 600 of FIG. 6A. The interface 650 can allow a user to proceed to a subtask involving beneficial ownership information for the selected entity (e.g., XYZ Corporation). The interface 650 includes a layout and some features similar to those of the second user interface 600 shown in FIG. 6A, and like reference numerals refer to like elements. The content area 604 of the interface 650 includes an instructional area 660 that provides directions to the user for completing form information displayed below. The content area 604 also includes text fields 662 relating to information on individuals with control of the selected entity. For example, text fields 662 are provided for a legal name, a registered address, and a physical address. In some arrangements, the text fields 662 can be editable by the user. For example, the user can enter text into these text fields 662, for example by using a keyboard, a touchscreen interface, or another text entry mechanism. In some other arrangements, information displayed in the text fields 662 may be static or otherwise not editable by the user. Below the text fields 662 is an area displaying legal entities for which no individual meets a threshold ownership stake (i.e., 25%). Yes and No toggle buttons are displayed next to each respective legal entity in this area. The user can select one of the toggle buttons for each listed entity.

A Continue button 664 and a Clear button 666 are also shown. Before a selection of one toggle button for every entity shown in the interface 650 is selected, the Continue button 664 can be "greyed out" or otherwise displayed in a manner that indicates that the Continue button 664 is not yet selectable by the user. After a selection has been made of one toggle button for every entity shown in the interface 650, the Continue button 664 may be shown in a selectable manner, as shown in FIG. 6B. Selecting the Continue button can cause the user device 110 to transmit the information represented by the selected toggle buttons to the provider institution computing system 130 via the network 170. The provider institution computing system 130 can store the information for later retrieval. In addition, a subsequent interface screen can be displayed to the user. In some arrangements, for entities whose ownership stake are indicated as not correct using the toggle buttons, the user may also be prompted to input correct information, for example by entering text in one or more text fields 662, in the same interface 650 or in a different interface. Selecting the Clear button 616 can cause any toggle button selections to be deleted. However, the interface 650 can remain displayed and the user may again proceed to select the correct toggle button for each respective legal entity.

Referring now to FIG. 6C, an exemplary user interface 670 is shown according to an example embodiment. In some arrangements, the interface 670 can be displayed upon selection of the Continue button 664 in the interface 650 of FIG. 6B. The interface 670 can allow a user to complete the task labeled Step 2 in the interface 500 of FIG. 5. The interface 670 includes a layout and some features similar to those of the second user interface 600 shown in FIG. 6A, and like reference numerals refer to like elements. The content area 604 of the interface 670 displays the subtasks for Step 2 and indicates that the status for each of these subtasks is "Completed." As a result, a Confirm and Continue button 674 is displayed. In some arrangements, selecting the Confirm and Continue button 674 can cause the user device 110 to transmit any of the information submitted by the user for each of the subtasks of Step 2 to the provider institution computing system 130 via the network 170. The provider institution computing system 130 can store the information for later retrieval. As described above, in some arrangements information submitted by the user for each of the subtasks may already be stored by provider institution computing system 130, for example as a result of the user taking actions to complete each subtask. Thus, in some arrangements, selecting the Confirm and Continue button 674 may not cause the user device 110 to retransmit such information, but instead may transmit only an indication of the selection of the Confirm and Continue button 674 to the provider institution computing system 130 via the network 170. In response, the provider institution computing system 130 can mark the data submitted in connection with each of the subtasks as verified or can otherwise store an indication that the information has been verified. In addition, a subsequent interface screen can be displayed to the user.

In some implementations, the user can also choose to select any of the rows in the content area 604 to view or edit information for the corresponding subtask, prior to selecting the Confirm and Continue button 674. Selecting the Cancel button 676 can cause the information submitted during completion of the subtasks of Step 2 to be discarded. In some arrangements, a warning may be displayed to the user upon selection of the Cancel button 676 to inform the user that the user's selections will not be saved unless the user selects the Confirm and Continue button 674.

Referring now to FIG. 7, an exemplary third user interface 700 is shown according to an example embodiment. In some arrangements, the third user interface 700 can be displayed upon selection of the Confirm and Continue button 674 in the interface 670 of FIG. 6C. The third user interface 700 includes a content portion 704 that can be similar to the content portion 504 of the interface 500 shown in FIG. 5. However, because the third user interface 700 is displayed after the task corresponding to Step 2 (and its subtasks) has been completed, the information shown in the status column in the third user interface 700 of FIG. 7 indicates that Step 2 is now complete. Step 3, which relates to additional client information, remains to be completed, and is therefore represented with a selectable link 710. In addition, subtasks related to this task can automatically be displayed beneath and labeled with an "Action Required" status initially, to indicate that the user must take action on these tasks in order to advance the process. Selecting the link 710 can cause a new interface to be displayed.

Referring now to FIG. 8A, an exemplary user interface 800 is shown according to an example embodiment. In some arrangements, the interface 800 can be displayed upon selection of the link 710 in the third user interface 700 of FIG. 7. The interface 800 can allow a user to complete the first subtask of Step 3 by reviewing and confirming legal entity names and beneficial ownership information. The interface 800 includes a layout and some features similar to those of the interface 500 shown in FIG. 5, among others, and like reference numerals refer to like elements. For example, the interface 800 includes a navigation pane 802 on the left hand side and a content area 804 to the right of the navigation pane 802. The interface 800 also includes a Sing Off button 808 in the lower left hand corner.

The content area 804 displays information relating to names under which certain entities are doing business, which can be referred to as "doing business as" names. The content area 804 includes an instructional area 810 that displays directions to the user for completing form information displayed below. For each legal entity, a "doing business as" name is displayed along with a respective Yes toggle button and No toggle button. The user can select either the Yes toggle button or the No toggle button for each legal entity, depending on whether or not the displayed "doing business as" names are correct. The interface 800 also includes a Continue button 812 and a Cancel button 814. Before a selection of one toggle button for every entity shown in the interface 800 is selected, the Continue button 812 can be "greyed out" or otherwise displayed in a manner that indicates that the Continue button 812 is not yet selectable by the user.

After a selection has been made of one toggle button for every entity shown in the interface 800, the Continue button 812 may be shown in a selectable manner, as shown in FIG. 8A. Selecting the Cancel button 814 can cause the information represented by the toggle buttons to be discarded without being saved, and a previous interface screen (e.g., the third user interface 700 of FIG. 7) to be displayed. In some arrangements, a warning may be displayed to the user upon selection of the Cancel button 814 to inform the user that the user's selections will not be saved unless the user selects the Continue button 812. Selecting the Continue button 812 can cause the user device 110 to transmit the information represented by the selected toggle buttons to the provider institution computing system 130 via the network 170. The provider institution computing system 130 can store the information for later retrieval. In addition, a subsequent interface screen can be displayed to the user. In some arrangements, for entities whose "doing business as" names are indicated as not correct using the toggle buttons, the user may also be prompted to input correct information, for example by entering text in one or more text fields 662, in the same interface 800 or in a different interface.

The interface 800 also includes a Clear button 816. Selecting the Clear button 816 can cause any toggle button selections to be deleted. However, the interface 800 can remain displayed and the user may again proceed to select the correct toggle button for each respective legal entity. To return to the previous interface (e.g, the third user interface 700 of FIG. 7), the user may select the Return link 818. In some arrangements, selecting the Return link 818 can cause the user device 110 to transmit the information represented by any selected toggle buttons to the provider institution computing system 130 via the network 170. The provider institution computing system 130 can store the information for later retrieval, and can then transmit to the user device 110 information corresponding to the previous display screen. Subsequently, if the user returns to the interface 800, the provider institution computing system 130 can prepopulate the toggle buttons with the previous user selections so that the user's work is saved. The interface 800 also includes an Expand All button 820 that can expand rows for all subtasks of Step 3. In some arrangements, subtasks other than the currently active subtask can be expanded in a "greyed out" or "read only" manner so that the user can see information related to the other subtasks but cannot interact with the other subtasks. In some arrangements, subtasks must be completed sequentially, for example in the order in which they are displayed from top to bottom in the content area 804 of the interface 800. Selecting the Continue button 812 can cause a subsequent interface to be displayed, as described above.

Referring now to FIG. 8B, an exemplary user interface 850 is shown according to an example embodiment. In some arrangements, the interface 850 can be displayed upon selection of the Continue button 812 in the interface 800 of FIG. 8A. However, it should be understood that in some arrangements, a user may be presented with different or additional interfaces before the interface 850 is displayed. The interface 850 can allow a user to complete the task labeled Step 3 in the interface 500 of FIG. 5. The interface 850 includes a layout and some features similar to those of the interface 670 shown in FIG. 6C, and like reference numerals refer to like elements.

The content area 804 of the interface 850 displays the subtasks for Step 3 and indicates that the status for each of these subtasks is "Completed." As a result, a Confirm and Submit button 874 is displayed. In some arrangements, selecting the Confirm and Submit button 874 can cause the user device 110 to transmit any of the information submitted by the user for each of the subtasks of Step 3 to the provider institution computing system 130 via the network 170. The provider institution computing system 130 can store the information for later retrieval. As described above, in some arrangements information submitted by the user for each of the subtasks may already be stored by provider institution computing system 130, for example as a result of the user taking actions to complete each subtask. Thus, in some arrangements, selecting the Confirm and Submit button 874 may not cause the user device 110 to retransmit such information, but instead may transmit only an indication of the selection of the Confirm and Submit button 874 to the provider institution computing system 130 via the network 170. In response, the provider institution computing system 130 can mark the data submitted in connection with each of the subtasks as verified or can otherwise store an indication that the information has been verified. In addition, a subsequent interface screen can be displayed to the user. In some implementations, the user can also choose to select any of the rows in the content area 804 to view or edit information for the corresponding subtask, prior to selecting the Confirm and Continue button 874.

Figure 9:
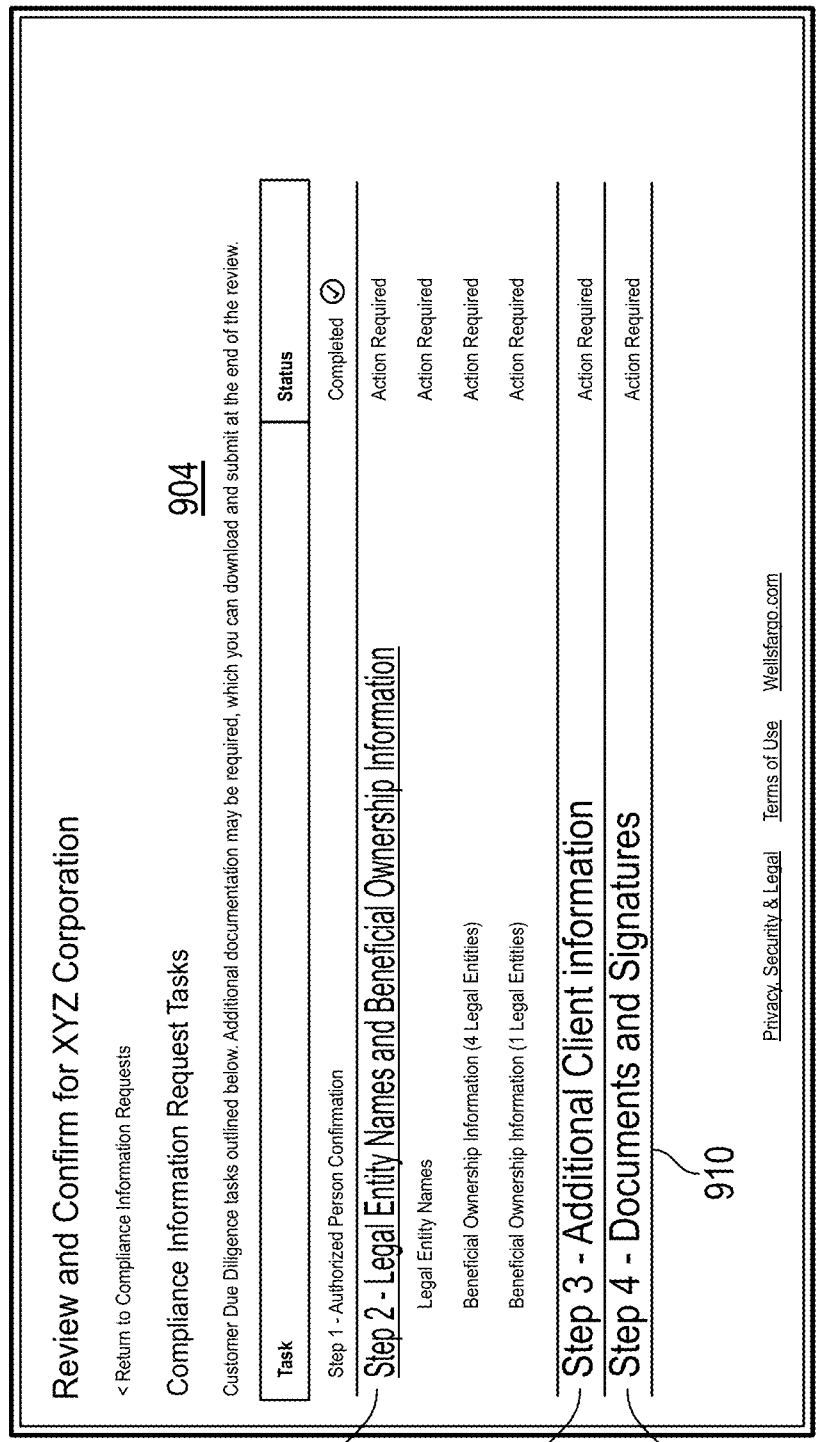
FIG. 9 depicts an exemplary user interface, according to an example embodiment.

Referring now to FIG. 9, an exemplary fourth user interface 900 is shown according to an example embodiment. The fourth user interface 900 includes a content portion 904 that can be similar to the content portion 704 of the third user interface 700 shown in FIG. 7. However, user interface 900 can include a fourth task 920, which can relate to an exchange of documents (e.g., downloading, populating, uploading, etc.). In some arrangements, the fourth user interface 900 can be displayed upon selection of the Confirm and Submit button 874 in the interface 850 of FIG. 8B. In other arrangements, the fourth user interface 900 can be displayed upon selection of the Continue button 412 from Step 1 or the Confirm and Continue button 674 from Step 2. The fourth user interface 900 can be a conditional user interface (e.g., display of the fourth user interface 900 may depend on specific user inputs).

For example, if a user provides a value that matches a predetermined value indicating that documents are be submitted, the fourth user interface 900 can be displayed. In other embodiments, the fourth user interface can be displayed when documents were submitted previously, but are stale (e.g., out of date) or need to be updated. For example, the provider institution computing system 130 can establish that selecting "No" with regards to the beneficial ownership information or a doing business as name of a secondary entity requires at least one new document to be submitted. Therefore, when the data management circuit 138 detects that the value provided by the user was "No" regarding either of those questions, the fourth user interface 900 can be displayed, causing the user to upload new documents. The fourth user interface 900 can be displayed since at least one document regarding beneficial ownership (e.g., Certification of Beneficial Ownership form) and/or a doing business as name (e.g., Change Request form) is required based on the "No" inputs. The fourth user interface 900 can include a selectable link 910 once all the previous steps are completed. Selecting the link 910 can cause a new interface to be displayed.

Referring now to FIG. 10, an exemplary user interface 1000 is shown according to an example embodiment. In some arrangements, the interface 1000 can be displayed upon selection of link 910 in the fourth user interface 900 of FIG. 9. The interface 1000 can allow a user to view the documents (i.e., forms) that need to be filled out, download the necessary documents, and upload the documents once completed. The user interface 1000 includes a layout and some features similar to those of interface 850 shown in FIG. 8B, among others, and like reference numerals refer to like elements. For example, the user interface 1000 can include a navigation portion 1002, a content portion 1004 and a Confirm and Submit button 1074.

The content portion 1004 can display action items and submitted items, along with additional information in tabular form. Each document can be displayed in tabular form, where selecting the tab can expand the tab to provide more information regarding the document. For example, the content area 1004 can show a separate row for each document requested, along with several columns to denote the status of the request, the status date, and an "Action" column to allow the user to perform an action relating to the form. For example, selecting the "Change Request for Creative Plastics" tab 1008 can cause an Item Description and/or a Request Description to appear.

In some arrangements, the Action column can include a Select button 1006. The Select button 1006 can provide the user options for actions to take. For example, selecting the Select button 1006 can provide the user, via the user device 110, options to view, download, or upload the associated requested form. If the user does not have the form, the user can download it or open it from user interface 1000 to fill it out either manually or electronically. If the user already completed a document, the document can be uploaded from user interface 1000. In some arrangements, the user can also provide an electronic signature for any such document.

Referring now to FIG. 11, an exemplary summary user interface 1100 is shown according to an example embodiment. In some arrangements, the summary user interface 900 can be displayed upon selection of the Confirm and Submit button 1074 in the interface 1000 of FIG. 10. The summary user interface 1100 can indicate to the user that a compliance information request has been submitted to the provider institution computing system 130 via the network 170. The summary user interface 1100 can include a layout and some features similar to those of the interface 1000 shown in FIG. 10, among others, and like reference numerals refer to like elements. For example, the summary user interface 1100 includes a navigation portion 1102 and a content portion 1104.

The content portion 1104 displays the date on which the compliance information request was submitted, along with additional information in tabular form. For example, the content area 1104 shows rows for each legal entity associated with the compliance information request, along with several columns to denote the name of the legal entity, any form needed with respect to the legal entity, a due date for submitting the form, and an "Action" column to allow the user to perform an action relating to the document. For example, documents can include change request forms or certification of beneficial ownership (COBO) forms.

In some arrangements, the Action column may include a Download button 1106, similar to Select button 1006. The Download button 1106 can cause the user device 110 to download information corresponding to the respective form via the network 170. For example, the user device 110 can download form data from the provider institution computing system 130 or from any of the third party computing systems 160. The form data can be provided, for example, in a printable format such as a PDF file. Thus, the user can print and manually complete such a document. In some other arrangements, the form may be electronically fillable, for example via the user device 110. For example, the provider institution computing system 130 can provide additional data corresponding to interfaces structured to prompt the user to provide form information, to collect the information from the user, and to retrieve that information over the network 170. In some arrangements, the user may also be able to provide an electronic signature for any such form.

Referring now to FIG. 12, an exemplary list of submitted items 1200 is shown according to an example embodiment. The list of submitted items 1200 can be displayed as its own user interface or it can be included in the summary user interface 1100. The list of submitted items 1200 displays the documents that the user uploads while completing the compliance information request. For example, any document listed under Step 4 that is submitted by the user can appear on the list of submitted items 1200. In other embodiments, the list of submitted items 1200 can be updated to reflect documents that were submitted by other means (e.g., manually, email, etc.). Regardless of whether the list of submitted items 1200 is its own user interface or is a part of summary user interface 1100, the interface with the list of submitted items can include a Close Summary button 1202. Selecting the Close Summary button 1202 can conclude the process of providing and updating requested information described herein. In other embodiments, selecting the Close Summary button 1202 can cause the user device to display any previous user interface described herein or take the user back to the beginning of the process.

Figure 13:
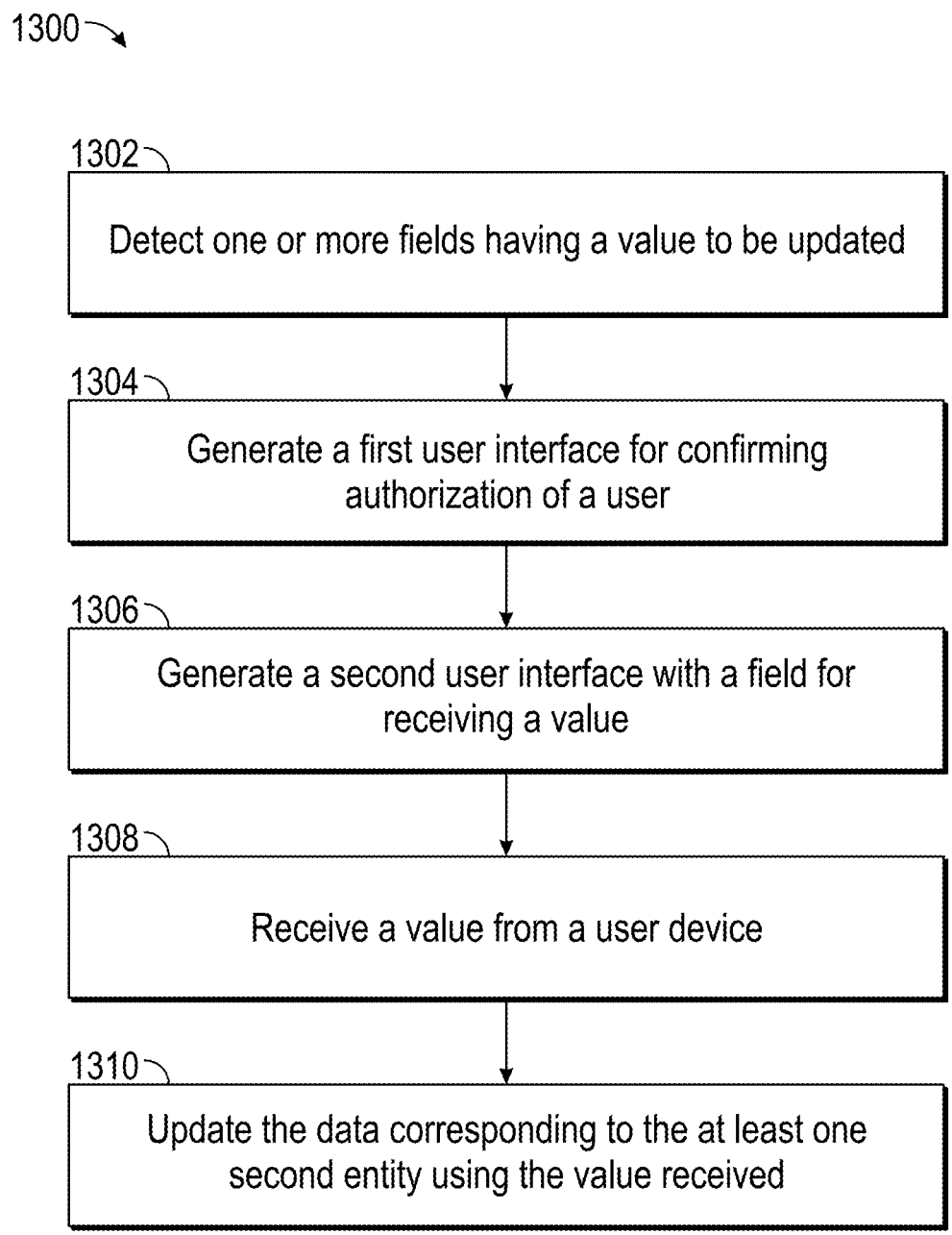
FIG. 13 is a flow diagram of a method of storing and verifying data.

Referring now to FIG. 13, depicted is a flowchart showing a method 1300 of storing and verifying data, according to an illustrative embodiment. The method 1300 may be implemented or performed by one or more of the components described above, and is described with reference to specific components, elements, and devices described above with reference to FIG. 1-FIG. 12. As a brief overview, at step 1302, the data management circuit 138 detects that one or more fields 208 corresponding to at least one secondary entity 330 has a value to be updated. At step 1304, the data management circuit 138 generates a first user interface 400. At step 1306, the data management circuit 138 generates a second user interface 600. At step 1308, the data management circuit 138 receives the value from the user device 118. At step 1310, the data management circuit 138 updates the data corresponding to the at least one secondary entity 330 using the value received (e.g., at step 1308).

In some embodiments, prior to step 1302, the data management circuit 138 may generate a preliminary user interface 340 displaying one or more primary entities 329 with associated selectable buttons 342. Selecting the selectable button 342 for a primary entity 329 allows the user to view information that has already been entered pertaining to the corresponding primary entity 329. For example, a user could have previously provided compliance information regarding the primary entity or the related secondary entities, such as legal entity name or address. Selecting the selectable button 342 can allow the user to view a summary of that previously provided information before having to provide additional information or updated information, whichever is requested.

At step 1302, the data management circuit 138 detects that one or more fields 208 corresponding to at least one secondary entity 330 has a value to be updated. The field may pertain to any information related to the at least one secondary entity 330, for example, legal entity name, beneficial ownership information, address, market served, etc. The field 208 may need updating because the field 208 is missing a value or may have a value that is stale or incorrect. For example, information regarding beneficial ownership can be requested. This request could be based on the information never having been provided before, or the information provided before is out of date. Determining whether information is out of date could be based on a length of time that has lapsed since the most recent update, so the request is looking for verification of the current information, or it is determined that the information is no longer accurate, and new information needs to be provided. If the information only requires verification, the user can be given an option to verify the information, or, if the information is incorrect, an option to update the information.

The data management circuit 138 may access the provider institution accounts database 134 to detect that the one or more fields 208 has a value to be updated. The provider institution accounts database 134 may be structured to retrievably store data corresponding to a plurality of entities including a primary entity 329 related to a plurality of secondary entities 330. The provider institution accounts database 134 may store data for each of the primary and secondary entities 329, 330. The data may include values for a plurality of fields 208 associated with the respective entity, such as those described above with reference to FIG. 1-9.

At step 1304, responsive to detecting that a value is to be updated, the data management circuit 138 generates a first user interface 400 for rendering at a user device 118 associated with the primary entity 329. The first user interface 400 may cause the user to confirm authorization to provide the value for the one or more fields 208 corresponding to each of the plurality of secondary entities 330. Via the first user interface 400, the user indicates on behalf of which subset of the plurality of secondary entities 330 they are authorized to provide and update information. Of the plurality of secondary entities 330 displayed on the first user interface 400, the user may be authorized to provide data for one, some, all, or none of plurality of secondary entities. In some instances, the data management circuit 138 may receive, from the user device 118 via the first user interface 400, confirmation of authorization for a subset of the plurality of secondary entities 330 (and may receive a denial of authorization for at least one secondary entity 330). If authorization is not confirmed for one or more of the plurality of secondary entities 330, those secondary entities 330 may be removed from the review process, and the user may not be asked to update or provide information regarding those secondary entities.

At step 1306, responsive to the user confirming authorization for at least one of the plurality of secondary entities 330, the data management circuit 138 generates a second user interface 600. The second user interface 600 includes a field 208 for receiving a value. In some implementations, the number of fields 208 may correspond to the number of values that need updating (e.g. if only one value needs updating, then only one field 208 is provided). In some implementations, the number of fields 208 may relate to a particular form which is to be filled out, and the fields 208 which already include acceptable values may be pre-populated with the values from the account database 134. In such implementations, the field 208 which is to receive an updated value from the user may be blank (or otherwise called out to the user), such that the user can input the value to the empty field 208. The value input by the user may be input either manually (e.g. writing or typing in words, numbers, or other characters), by selecting certain options or buttons (e.g. selecting toggle buttons), and so forth. The value may correspond to any information related to the subset of secondary entities 330. For example, the value may include entity name, beneficial ownership information, doing business as, registered address, physical address, associated address, market served, legal ownership, other related parties, or other related information.

The data management circuit 138 may organize the fields 208 that have values which need updating into separate tasks. Each task may have a corresponding status 524 indicating whether the user needs to provide additional values related to that specific task or if that task is complete. The data management circuit 138 may generate a series of user interfaces (e.g., one user interface corresponding to one or more of the series of tasks) that guide the user through updating each task in order. For example, a second user interface 600 may display a second task 520 and a third user interface 700 may display a third task 522, where each task is to be completed prior to the next task. Each user interface causes the user to input values into fields 208 associated with the corresponding task. Each user interface can have a Continue button 664 that is not selectable until all the required information is provided. For example, if all the fields in the second user interface 600 are not given a value (e.g. the toggle buttons are not selected), the Continue button 612 may not be selectable, preventing the user from continuing to the third user interface 700.

In some embodiments, the data management circuit 138 may generate a summary user interface 1100 to display the secondary entity 330 that needed a value updated and a selectable download button 906. The selectable Download button 1106, when selected, may be configured to provide one or more forms needed for the corresponding entity that can be read, filled out, and/or printed by the user. For example, forms can include change request forms or certification of beneficial ownership (COBO) forms.

At step 1308, the data management circuit 138 receives the value from the user device 118 provided via the user interface 600 to the field 208. In another embodiment, if there are several fields 208 that need values updated, those values may be input by the user via the same user interface (or via a series of user interfaces). The data management circuit 138 may receive each of the values input by the user via the user device 118 to the user interface(s). For example, when a user selects a toggle button or types information into a field 208, that information is sent to the data management circuit 138 once it is submitted by the user.

At step 1310, the data management circuit 138 revises, replaces, modifies, or otherwise updates the data corresponding to the at least one secondary entity 330 using the value received (e.g., at step 1308) in the provider institution account database 134. For example, the data management circuit 138 may update the data from the account database 134 for the secondary entity 330 to include the value received at step 1308. As such, the data corresponding to the secondary entity 330 may include the existing or prior data for the secondary entity 330 accompanied with the value received from the user device 118.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
 a provider institution accounts database structured to retrievably store data corresponding to a plurality of entities including a primary entity related to a plurality of secondary entities, the primary entity comprising an enterprise and the plurality of secondary entities comprising a plurality of subsidiaries of the enterprise, the data for each of the plurality of entities including values for a plurality of fields associated with the respective entity; and
 a data management circuit including one or more processors, the data management circuit configured to:
  detect one or more fields corresponding to the plurality of secondary entities has a value which is to be updated, based on the value for the one or more fields being stale or empty;

generate, responsive to detecting that the value is to be updated, a first user interface for rendering at a user device for a user associated with the primary entity to initiate a review process of the data stored on the provider institution accounts database corresponding to the plurality of entities, the user being an agent of at least one subsidiary of the plurality of subsidiaries, wherein the first user interface causes the user to confirm authorization to provide the value for the one or more fields corresponding to the plurality of secondary entities;

receive a confirmation of authorization for a subset of secondary entities of the plurality of secondary entities:

remove, responsive to receiving the confirmation of authorization for the subset of secondary entities, at least one unauthorized secondary entity of the plurality of secondary entities from the review process;

generate, responsive to receiving the confirmation of authorization for the subset of secondary entities, a second user interface including a field to receive the value for at least one of the subset of secondary entities;

receive, from the user device, the value provided by the user via the second user interface for the field; and update the data corresponding to the at least one of the subset of secondary entities in the provider institution accounts database using the value received from the user device.

2. The system of claim 1, wherein each of the plurality of secondary entities has a corresponding value which is to be updated, and wherein the first user interface causes the user to confirm authorization to provide the value for the one or more fields corresponding to the subset of secondary entities.

3. The system of claim 2, wherein the data management circuit is configured to receive, from the user device, a confirmation of authorization for the subset of secondary entities including the at least one secondary entity, and a denial of authorization for the at least one unauthorized secondary entity.

4. The system of claim 3, wherein the second user interface includes a plurality of fields for receiving values for each of the subset of secondary entities, and wherein the data management circuit updates the data corresponding to the subset of secondary entities in the provider institution accounts database using the values received from the user device.

5. The system of claim 1, wherein the field requests the user to verify or provide legal entity names and beneficial ownership information of the plurality of secondary entities.

6. The system of claim 1, wherein the field requests the user to verify or provide additional client information including at least one of: a doing business as name, a registered address, a physical address, an associated address, a market served, legal ownership information, or other related parties information.

7. The system of claim 1, wherein the data management circuit is further configured to organize the one or more fields that has a value which is to be updated into one or more tasks.

8. The system of claim 7, wherein the data management circuit generates a series of user interfaces including the second user interface and a third user interface, wherein the second user interface is for a second task and the third user interface is for a third task, and wherein the second task to be completed prior to the third task.

9. The system of claim 7, wherein each of the one or more tasks has a corresponding status indicating whether the user is to provide additional values relating to the one or more tasks.

10. The system of claim 1, wherein the one or more tasks are completed by at least one of selecting toggle buttons or entering a value to a text field of the user interface of the user device.

11. The system of claim 1, wherein the data management circuit is further configured to generate, responsive to receipt of the value provided via the second user interface to the field, a summary user interface displaying the at least one of the subset of secondary entities and a selectable download button for downloading one or more forms related to the at least one of the subset of secondary entities.

12. The system of claim 1, wherein the data management circuit is further configured to generate a preliminary user interface including a selectable button which, when selected, causes the user device to display information from the provider institution accounts database.

13. The system of claim 1, wherein the data management circuit is further configured to detect that the value provided by the user via the second user interface matches a predetermined value, wherein the predetermined value indicates that at least one new document corresponding to the at least one of the subset of secondary entities needs to be uploaded.

14. The system of claim 13, wherein the data management circuit is further configured to generate a third user interface causing the user to upload the at least one new document corresponding to the at least one of the subset of secondary entities secondary entity.

15. The system of claim 14, wherein the data management circuit is further configured to receive, from the user device, the at least one new document uploaded by the user via the third user interface.

16. The system of claim 15, wherein the data management circuit is further configured to generate, responsive to receiving the at least one new document, a summary user interface including a list of submitted items.

17. A method comprising:

maintaining, by a provider institution accounts database, data corresponding to a plurality of entities including a primary entity related to a plurality of secondary entities, the primary entity comprising an enterprise and the plurality of secondary entities comprising a plurality of subsidiaries of the enterprise, the data for each of the plurality of entities including values for a plurality of fields associated with the respective entity;

detecting, by a data management circuit, one or more fields corresponding to the plurality of secondary entities has a value which is to be updated, based on the value for the one or more fields being stale or empty;

generating, by the data management circuit responsive to detecting that the value is to be updated, a first user interface for rendering at a user device for a user associated with the primary entity to initiate a review process of the data stored on the provider institution accounts database corresponding to the plurality of entities, the user being an agent of at least one subsidiary of the plurality of subsidiaries, wherein the first user interface causes the user to confirm authorization to provide the value for the one or more fields corresponding to the plurality of secondary entities;

receiving, by the data management circuit from the user device, a confirmation of authorization for a subset of secondary entities of the plurality of secondary entities:

removing, by the data management circuit responsive to receiving the confirmation of authorization for the subset of secondary entities, at least one unauthorized secondary entity of the plurality of secondary entities from the review process:

generating, by the data management circuit responsive to receiving the confirmation of authorization for the subset of secondary entities, a second user interface including a field for receiving the value for at least one of the subset of secondary entities;

receiving, by the data management circuit from the user device, the value provided by the user via the second user interface for the field; and updating, by the data management circuit, the data corresponding to the at least one of the subset of secondary entities in the provider institution accounts database using the value received from the user device.

18. The method of claim 17, wherein each of the plurality of secondary entities has a corresponding value which is to be updated, and wherein the first user interface causes the user to confirm authorization to provide the value for the one or more fields corresponding to the subset of secondary entities.

19. The method of claim 18, further comprising receiving, by the data management circuit, from the user device, a confirmation of authorization for the subset of secondary entities including the at least one secondary entity, and a denial of authorization for the at least one unauthorized secondary entity.

20. The method of claim 19, wherein the second user interface includes a plurality of fields for receiving values for each of the subset of secondary entities, and wherein the data management circuit updates the data corresponding to the subset of secondary entities in the provider institution accounts database, using the values received from the user device.

21. The method of claim 17, further comprising generating, by the data management circuit responsive to receiving the value provided via the second user interface to the field, a summary user interface displaying the data corresponding to the at least one of the subset of secondary entities for which the value was updated, and a selectable download button.

22. A non-transitory computer readable medium having computer-executable instructions embodied therein that, when executed by a data management circuit of a provider institution computing system, causes the provider institution computing system to perform operations to store and verify data, the operations comprising:

maintaining, by a provider institution accounts database, data corresponding to a plurality of entities including a primary entity related to a plurality of secondary entities, the primary entity comprising an enterprise and the plurality of secondary entities comprising a plurality of subsidiaries of the enterprise, the data for each of the plurality of entities including values for a plurality of fields associated with the respective entity;

detecting one or more fields corresponding to the plurality of secondary entities has a value which is to be updated, based on the value for the one or more fields being stale or empty;

generating, responsive to detecting that the value is to be updated, a first user interface for rendering at a user device associated with the primary entity to initiate a review process of the data stored on the provider institution accounts database corresponding to the plurality of entities, the user being an agent of at least one subsidiary of the plurality of subsidiaries, wherein the first user interface causes the user to confirm authorization to provide the value for the one or more fields corresponding to the plurality of secondary entities;

receiving a confirmation of authorization for a subset of secondary entities of the plurality of secondary entities:

removing, responsive to receiving the confirmation of authorization for the subset of secondary entities, at least one unauthorized secondary entity of the plurality of secondary entities from the review process:

generating, responsive to receiving the confirmation of authorization for the subset of secondary entities, a second user interface including a field for receiving the value for at least one of the subset of secondary entities;

receiving, from the user device, the value provided by the user via the second user interface to the field; and updating the data corresponding to the at least one of the subset of secondary entities in the provider institution accounts database, using the value received from the user device.

* * * * *